W. L. JONES.
SPRING FOR AUTOMOBILES.
APPLICATION FILED JULY 15, 1921.

1,408,005. Patented Feb. 28, 1922.

Inventor
William L. Jones,
By
Attorney

UNITED STATES PATENT OFFICE.

WILLIAM L. JONES, OF SOUTH MILLS, NORTH CAROLINA.

SPRING FOR AUTOMOBILES.

1,408,005.

Specification of Letters Patent. Patented Feb. 28, 1922.

Application filed July 15, 1921. Serial No. 484,885.

*To all whom it may concern:*

Be it known that I, WILLIAM L. JONES, a citizen of the United States of America, and resident of South Mills, in the county of Camden and State of North Carolina, have invented certain new and useful Improvements in Springs for Automobiles, of which the following is a specification.

This invention relates to spring devices and particularly to a spring for automobiles, the said invention relating more particularly to a spring for use on Ford automobiles.

An object of this invention is to produce a spring which will withstand unusually hard wear or usage without fracturing and the parts of which are readily replaceable inexpensively should any one of the leaves become impaired.

It is furthermore an object of this invention to produce a spring unit of the character indicated in which the spring leaves extend oppositely from a central portion, novel means being provided for anchoring the inner ends of the springs in nested relation to each other and in nested relation to plates which are utilized for clamping the leaves of the spring together.

It is furthermore an object of this invention to produce a spring of the character indicated in which the oppositely disposed leaves for their inner ends interlock to effect an anchorage which will obviate or prevent the creeping or longitudinal movement of the leaves with respect to one another and the said device is applicable to Ford automobiles of the recent type as well as to the older machines.

With the foregoing and other objects in view, the invention consists in the details of construction, and in the arrangement and combination of parts to be hereinafter more fully set forth and claimed.

In describing the invention in detail, reference will be had to the accompanying drawings forming part of this specification wherein like characters denote corresponding parts in the several views, and in which—

Figure 1:
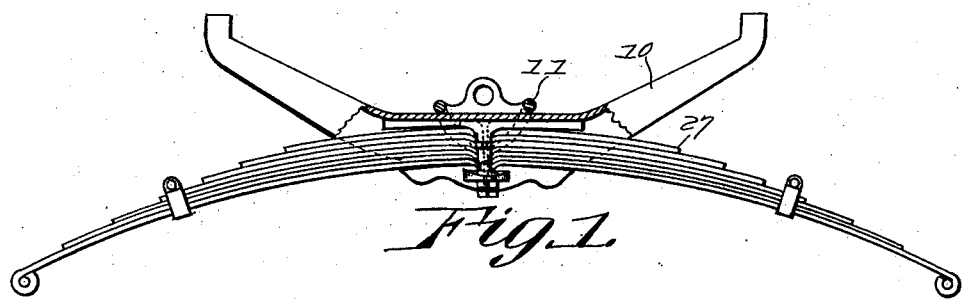
Figure 1 illustrates a sectional view of a portion of an automobile showing a device embodying the invention applied thereto.
Figure 2:
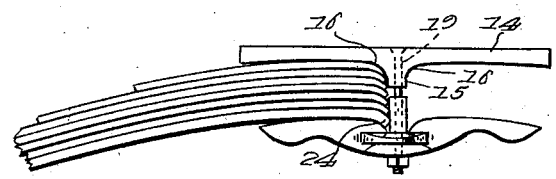
Figure 2 illustrates a view in elevation of a fragment of a spring showing the clamping plates disassociated from the automobile.
Figure 3:
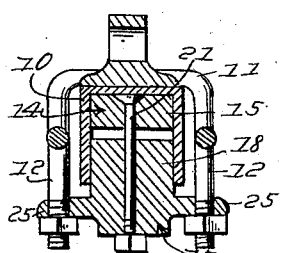
Figure 3 illustrates a central sectional view of the clamping plates.
Figure 4:
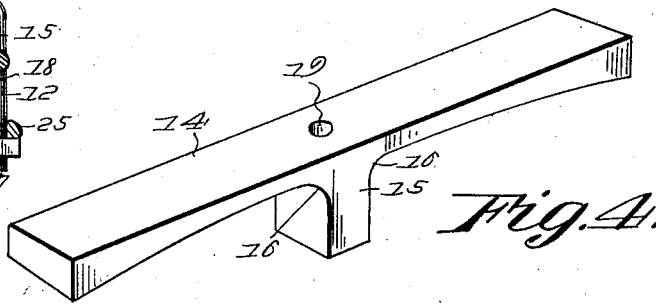
Figure 4 illustrates a perspective view of the upper clamping plate.
Figure 5:
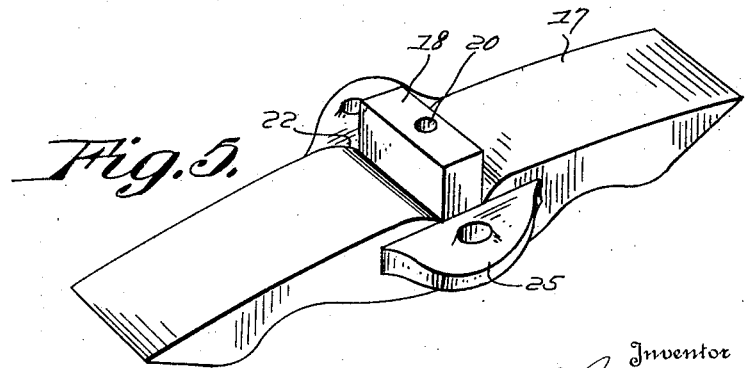
Figure 5 illustrates a perspective view of the lower clamping plate.

In these drawings 10 denotes a cross member which is the usual type employed on automobiles, the same being formed of a channel iron forming a seat and guide for the central portion of the spring. The new type of Ford automobiles has a double clip 11 which embraces the said cross member, and the spring, and it has a threaded shank 12 which extends through a plate for holding the spring in position, and the present invention is adapted to a clip of this character or to the old style clip, as will presently appear.

The spring in the present embodiment of the invention comprises an upper plate 14 having a depending transverse rib 15 and the surface between the said plate and rib on each side of the rib is curved at the corners as shown at 16 in order that it will be adapted to the contour of the ends of the springs. The lower plate 17 has an upwardly extending transversely disposed rib 18 and the said ribs 15 and 18 are apertured as at 19 and 20 respectively, to receive a bolt 21 by which the plates are clamped together to exert pressure on the butt ends of the leaves of the springs.

The plate 17 at the junction of the rib 18 therewith is curved downwardly to form transversely disposed seats or grooves 22 which constitute anchorages for the ends of the lowermost leaves of the spring.

On each side of the central ribs the spring is composed of a series of leaves such as 27 and these may be increased or diminished in number to suit particular requirements or the thickness of the leaves, and owing to the fact that the bolt 21 may be of any appropriate length, it follows that the plates may be employed in connection or associated with any number of leaves within predetermined bounds. The inner end of each leaf is abruptly curved downwardly as shown at 24, the lowermost leaf on each side of the rib projecting into the seat or channel 22 and the superimposed leaves being successively extended downwardly to the contour of the one immediately therebelow so that when the upper clamping plate is secured in place, the leaves cannot move longitudinally and of course when the clamping plates with the spring sections are applied to the automobile and clamped, they are held against transverse movement by the sides of the channel of the member 10.

The lower plate 17 has apertured lugs 25 to receive the threaded shanks of the yoke of the type used in the new Ford automobiles but in case the spring embodying the invention is applied to the cars of the old type where two shackles are employed, the said shackles will embrace the plate and spring at points slightly removed from the apertured ears and hence the apertured ears will not interfere with the application of the spring to the Ford cars of the older types.

The construction of the plates and the provision for preventing dislodgement of the leaves and the provision for varying the number of leaves and their dimensions in connection with other features of the invention are advantageous and the device has proven efficient and satisfactory in use.

I claim—

1. In a spring for automobiles, an upper and lower clamping plate, transversely disposed ribs formed centrally of each of the clamping plates, the lower clamping plate having a transversely disposed groove or seat at the junction of the rib with the said plate, spring leaves having their inner ends terminating at the shoulders of the plates, said springs being abruptly bent downwardly at the ends to fit in the grooves of the plates and to interlock with one another, and a clamping element for holding the plates in assembled relation to the said leaves.

2. In a spring for automobiles, an upper and lower clamping plate, the said plates having transversely disposed central ribs, said ribs being apertured, a bolt extending through the apertures of the said plates and ribs, the upper plate having curved surfaces at the junction of the rib with the said plate, the said lower plate having transversely disposed grooves forming seats at the junction of the rib therewith, and spring leaves having their inner ends abutting said ribs and having their downwardly bent ends adapted to interlock with the plate and with one another.

3. In a spring for automobiles, an upper and lower clamping plate, the said plates having transversely disposed central ribs, said ribs being apertured, a bolt extending through the apertures of the said plates and ribs, the upper plate having curved surfaces at the junction of the rib with the said plate, the said lower plate having transversely disposed grooves forming seats at the junction of the rib therewith, spring leaves having their inner ends abutting said ribs and having their downwardly bent ends adapted to interlock with the plate and with one another, and means for securing the spring to an automobile.

4. In a spring for automobiles, an upper and lower clamping plate, the said plates having transversely disposed central ribs, said ribs being apertured, a bolt extending through the apertures of the said plates and ribs, the upper plate having curved surfaces at the junction of the rib with the said plate, the said lower plate having transversely disposed grooves forming seats at the junction of the rib therewith, spring leaves having their inner ends abutting said ribs and having their downwardly bent ends adapted to interlock with the plate and with one another, and apertured lugs on the lower plate adapted to receive a shank of a clip for securing the clip to an automobile.

WILLIAM L. JONES.